UNITED STATES PATENT OFFICE.

GUSTAV LINK, OF HÖCHST-ON-THE-MAIN, GERMANY, ASSIGNOR TO FARBWERKE, VORM. MEISTER, LUCIUS & BRÜNING, OF SAME PLACE.

BROWN DYE AND PROCESS OF MAKING SAME.

SPECIFICATION forming part of Letters Patent No. 674,137, dated May 14, 1901.

Application filed October 20, 1900. Serial No. 33,767. (Specimens.)

*To all whom it may concern:*

Be it known that I, GUSTAV LINK, Ph. D., a citizen of the Empire of Germany, residing in Höchst-on-the-Main, Germany, have invented certain new and useful Improvements in the Manufacture of a Brown Dyestuff for Cotton from 1:8 Dinitro-Naphthalene, of which the following is a specification.

By the action of different reducing agents on 1:8 dinitro-naphthalene dyestuffs for directly dyeing cotton may be obtained of which only blue-violet to black tints have hitherto become known. (See *Friedlander*, Vol. IV, page 349, &c.) I have found that under certain conditions—for instance, heating with sodium sulfid to a high temperature—a brown dyestuff for cotton may likewise be obtained, characterized by the great fastness of its dyes.

Example: Thirty parts, by weight, of finely-pulverized 1:8 dinitro-naphthalene are gradually introduced into a solution of two hundred parts of sodium sulfid ($Na_2S.9H_2O$) at about 50° centigrade in fifty parts of water till all is dissolved, whereupon the solution is evaporated to dryness. The residue is then spread on tin plates and heated in a drying-stove at 160° to 180° centigrade for from five to six hours until it becomes quite hard. A dark-brown mass is thus obtained which when pulverized may directly be employed for dyeing purposes. It is easily soluble in water to a deep-brown solution. When this solution is acidified, the dyestuff separates as an amorphous dark-brown precipitate, insoluble in pure water, readily soluble in caustic alkalies, sodium carbonate, ammonia, and sulfids of alkali metals.

Having now described my invention, what I claim is—

1. The herein-described process of making a brown dyestuff for cotton, which consists in evaporating to dryness the aqueous solution dinitro-naphthalene 1:8 and sodium sulfid, and heating the residue at a high temperature for a considerable time, substantially as set forth.

2. As a new product, the herein-described black-brown mass, which when pulverized may be directly employed for dyeing purposes, said mass being readily soluble in water with a dark-brown color, from which solution, on being acidified, the dyestuff is separated as an amorphous precipitate, said dyestuff being insoluble in pure water but readily soluble in caustic alkalies, sodium carbonate, ammonia and sulfids of alkali metals, substantially as set forth.

In testimony that I claim the foregoing as my invention I have signed my name in presence of two subscribing witnesses.

GUSTAV LINK.

Witnesses:
HEINRICH HAHN,
ALFRED BRISBOIS.